United States Patent [19]

Matsushima

[11] Patent Number: 4,962,936
[45] Date of Patent: Oct. 16, 1990

[54] SEALING UNIT

[75] Inventor: Noboru Matsushima, Fukushima, Japan

[73] Assignee: Nok Corporation, Tokyo, Japan

[21] Appl. No.: 287,026

[22] Filed: Dec. 21, 1988

[30] Foreign Application Priority Data

Dec. 24, 1987 [JP] Japan .................. 62-196390

[51] Int. Cl.⁵ .................. F16J 15/32; F16J 15/34
[52] U.S. Cl. ........................... 277/37; 277/39;
    277/68; 277/95; 277/133; 277/134; 277/152
[58] Field of Search ............... 277/37, 38, 39, 95,
    277/68, 133, 134, 25, 153, 152

[56] References Cited

U.S. PATENT DOCUMENTS

| | | | |
|---|---|---|---|
| 2,646,999 | 7/1953 | Barske | 277/133 X |
| 2,938,744 | 5/1960 | Fritch | 277/39 |
| 3,016,251 | 1/1962 | Gilbert | 277/133 X |
| 3,022,081 | 2/1962 | Kosatka | 277/39 |
| 3,275,333 | 9/1966 | Scott et al. | |
| 3,561,770 | 2/1971 | Corsi et al. | |
| 3,682,488 | 8/1972 | Matsushima | 277/39 X |
| 3,822,890 | 7/1974 | Bourgeois | |
| 4,118,856 | 10/1978 | Bainard et al. | 277/134 X |
| 4,285,526 | 8/1981 | Klinteberg et al. | 277/153 |
| 4,428,586 | 1/1984 | Romero | |
| 4,432,557 | 2/1984 | Drucktenhengst | |
| 4,632,404 | 12/1986 | Feldle et al. | 277/68 |
| 4,721,312 | 1/1988 | Hornberger | 277/37 |

FOREIGN PATENT DOCUMENTS 887446  1/1962  United Kingdom .................. 277/25

Primary Examiner—Allan N. Shoap
Attorney, Agent, or Firm—Fleit, Jacobson, Cohn, Price, Holman & Stern

[57] ABSTRACT

A unitized seal (A) for sealing between a stationary shaft (16) and the bore of a rotating housing is comprised of a rotary member (1) having an outer cylindrical portion (1a), a flange portion (4) extending radially inwardly from one end of the cylindrical portion (1a), and a curved or tapered portion (5) at the radially innermost portion of the flange portion (4), a stationary member (10) having at least a main seal lip (14), and at least an auxiliary dust lip (6). The seal lip (14) contacts the inside surface (3) of the flange portion (4) of the rotary member and the dust lip (6) contacts against the curved or tapered portion (5) of the rotary member.

16 Claims, 2 Drawing Sheets

SEALING UNIT

BACKGROUND OF THE INVENTION

1. Field of the Invention

The present invention relates to an improved radial shaft seal, more particularly, to an oil-tight seal between two mechanical parts which are assembled coaxially and rotatively relative to each other. The invention is especially suited to be used for sealing between a stationary shaft and the bore of a rotating wheel hub.

2. Description of the Prior Art

A unitized shaft seal for sealing between a stationary shaft and the bore of a rotating housing as shown in FIG. 4 is known from U.S. Pat. No. 3,561,770. Referring to FIG. 4, unitized seal 100 comprises: rotary wear sleeve assembly 101 which has a hole 102 and is mounted in a rotary housing (not shown); and a stationary seal element 104 mounted on a stationary shaft (not shown). The stationary seal element 104 is provided with a seal lip 105 and a spring 107 disposed in the seal lip 105 which urges the seal lip 105 on a peripheral outer cylindrical surface inside the bent portion 106. A dirt exclusion lip 108 is provided at the axial end of the inside cylindrical portion of the stationary seal element 104 to exclude dirt from getting inside the seal.

In the prior art unitized seal 100 constructed as described above, the stationary seal lip 105 slides in contacting engagement against the rotary wear sleeve 101 which is mounted on the rotary housing and the dirt exclusion lip 108 also slides in contacting engagement with the rotary wear sleeve 101, and thus the lip 105 seals inside oil from leaking outwardly and the lip 108 excludes outside dirt contaminants from getting inside.

However, this prior art unitized seal 100 has disadvantages such as the peripheral outer cylindrical surface, on which the seal lip 105 slides, must be finished precisely, and at the same time, the seal lip 105 must have a precise and smooth inside lip surface as the lip 105 works radially and seals the inside oil by a pumping action generated between sliding surfaces as a result of axial contact load distribution of the lip, and/or a hydrodynamic action of helical or bidirectional inclined, or regmented ridges provided on the sealing surface.

Furthermore, the unitized seal 100 has a deficiency of a shortened usable life owing to significant wear of the sealing lip 105 and the sliding surface of the rotary wear sleeve 101 by the effect of the total radial contact load of the sealing lip 105 which is constructed of continuous annular rubber and a spring enclosed in the sealing lip 105.

Adding to the above, the cost of the unitized seal is expensive because the construction of the parts are complicated and more time is necessary to manufacture it.

SUMMARY OF THE INVENTION

Accordingly, an object of the present invention is to provide a sealing unit which has an increased durability and an improved sealing ability by preventing wear of the sealing lip and also the construction of the unit is more simplified than the prior art unitized seal, and lower in cost because it is easier to manufacture.

To achieve the object mentioned above, the present invention is comprised mainly of two members: first, a rotary member provided with an outer cylindrical portion which is anchored by a press fit in the rotary bore, a radial flange portion extending radially inwardly from one end of the cylindrical portion, and a curved or tapered portion at the radially innermost portion of the flange portion; and second, a stationary member which is snugly fixed on a stationary shaft. The stationary member is provided with at least a main seal lip which seals the sealed fluid and at least an auxiliary dust lip which excludes dirt from getting inside. The seal lip softly contacts the inside surface of the radial flange portion of the rotary member and the dust lip exerts light pressure against the curved or tapered portion of the rotary member.

BRIEF DESCRIPTION OF THE DRAWING

The above and other objects, features and advantages of the present invention will be described hereinafter with reference to the accompanying drawings, in which like reference numerals are used to describe similar parts throughout the several views of the invention, and wherein.

DETAILED DESCRIPTION OF THE PREFERRED EMBODIMENT

Figure 1:
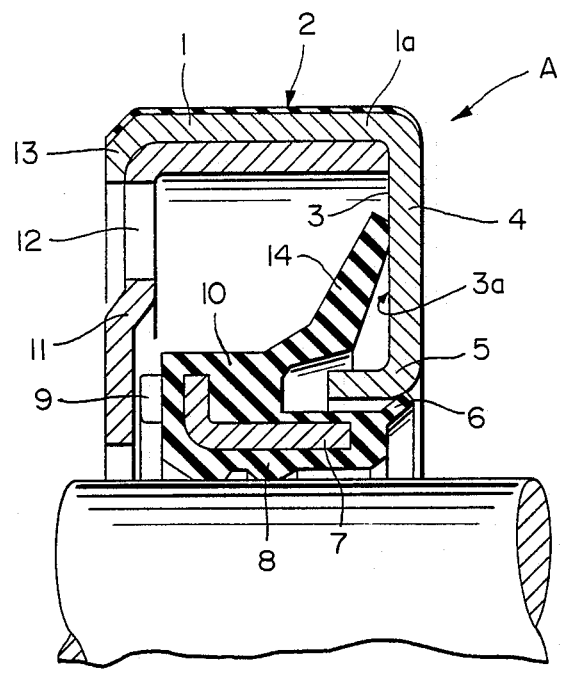
FIG. 1 is a cross-sectional view in elevation of the seal of the present invention.

The present invention will now be described in detail with respect to the embodiment shown in the accompanying drawings. In FIG. 1, A designates a unitized seal of the present invention.

The rotary member 1 has a cylindrical portion 1a, a radial flange portion 4, and a curved or tapered portion 5 which expands radially to the atmospheric side (right side in FIG. 1). On the outer peripheral surface of the cylindrical portion, a thin sealant coating or elastic material 2 is provided.

Stationary member 10 is snugly fixed on a stationary shaft 16 and has a seal lip 14, a dust lip 6, and inner anchor portion 8. The seal lip 14 is formed of rubber or the like material bonded on the reinforcing element 7, and extends axially and outwardly, and contacts the inside surface 3 of the rotary member 1. Also the dust lip 6 is provided so as to exert light pressure against the curved or tapered portion 5 of the rotary member to exclude dirt from getting inside.

A unitizing adapter ring 11, which has a plurality of holes 12 to return the oil, is provided and the edge 13 of the cylindrical portion of the rotary member 1 is turned over the adapter to lock the assembly in place.

Spacers or bumpers 9 spaced apart from each other are provided on the sealed fluid side surface of the stationary member 10. The plurality of spacers or bumpers 9 serve as guides during installation to locate the stationary member 10, and at the start of operations typically engage, loosely, the radial flange portion of the adapter 11. After the surfaces of the spacers 9 have worn off, they do not actually touch the flange portion of the adapter 11, but they still limit any movement of the stationary member 10.

The unitized seal constructed as described above operates as follows:

When the rotary member rotates, the sealed fluid moves radially outward in the rotating member 1 due to the centrifugal force of the rotating member 1. Seal lip 14 works as a one way valve to seal the splash of sealed fluid from leaking to the outside passing through the curved or tapered portion 5 during rotation and also seals in the static condition. In the rotating state, even if the sealed fluid passes out of the edge of the lip 14, the passed fluid can flow as an oil film through the lip edge from the inside surface 3a of the side portion 4 into the portion 3 due to the centrifugal force.

Similarly, the dust lip 6 excludes dirt from getting inside by the aid of centrifugal force of the rotating member 1 as the dirt is flung off along the outer wall of the flange portion 4 from the curved portion 5. In this case, the exertion of the dust lip is sufficient with only light pressure against the rotating portion 5 of the rotary member 1.

Figure 2:
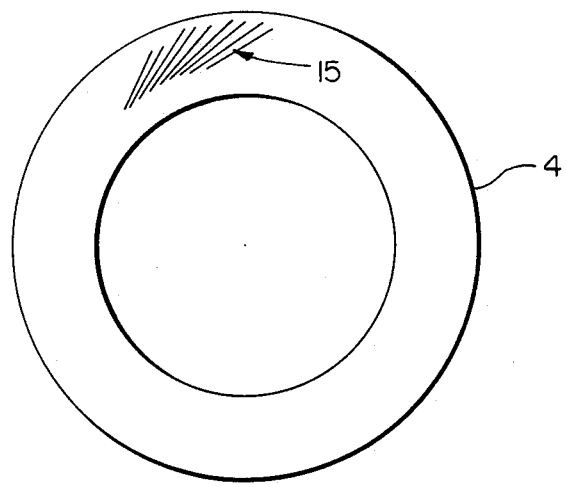
FIG. 2 is an end elevational view with parts omitted showing an example of helical grooves on the inner sliding surface of the rotary member.
Figure 3:
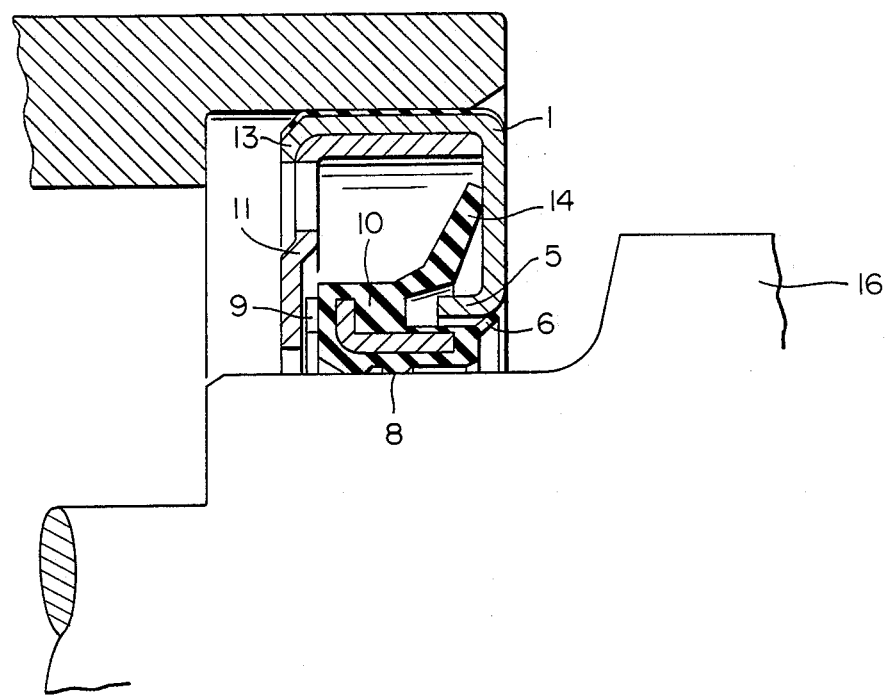
FIG. 3 is a cross-sectional fragmentary view of a hub bore and a shaft of an automobile incorporating a seal embodying the present invention.
Figure 4:
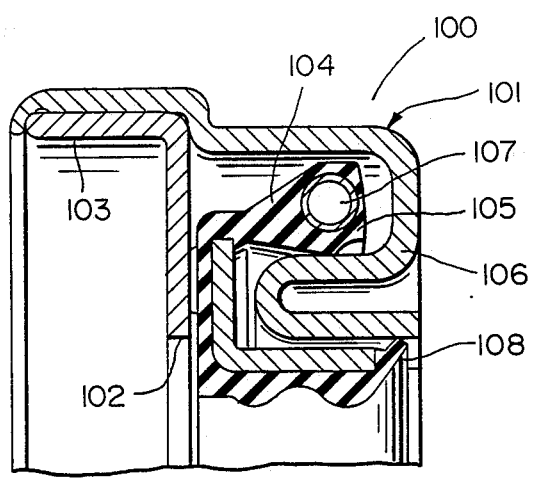
FIG. 4 is a view, similar to FIG. 1, of the prior art unitized seal.

Further, by providing inclined grooves 15 as shown in FIG. 2 or other forms of hydrodynamic grooves such as helical on the inside surface 3 of radial flange portion 4, pumping action will enhance the sealing performance. In case of rotation such as in a hub seal, bidirectional twill-shaped grooves will enhance the sealing performance similarly, i.e., the oil film on the inside surface 3 always tends to move radially outward, and further by addition of helical grooves, strong pumping action can be achieved.

The construction and performance of the present invention have been described in detail. The unitized seal of the present invention is an end face seal which utilizes a light pressure in the axial direction, differing from the prior art unitized seal which seals the fluid by the radial force of the rubber seal lip, and therefore the frictional torque and frictional heat generation are decreased significantly resulting in decrease in the wear of the seal lip 14 and sliding surface 3 of radial flange portion 4, so that the usable seal life is greatly elongated. Also the sealing performance is improved significantly.

At the same time, the sliding surface 3, on which the seal lip 14 slides, is a flat surface of original metal sheet and any extra surface finishing is not necessary. Because of this, the manufacturing process of the rotary member 1 is significantly simplified and the manufacturing cost of the unitized seal is greatly reduced. Therefore, the present invention is very advantageous not only from the standpoint of sealing performance and usable life, but also manufacturing cost.

Although the present invention has been described with respect to the specific embodiment shown and described herein, it is not limited thereto, and may be adapted to cover all obvious variations and embodiments thereof.

I claim:

1. A seal unit including two members, for sealing between a rotary bore and a stationary shaft comprising:
 a rotary member comprising an outer cylindrical portion for mounting by a press fit in a rotary bore, a radial flange portion extending radially inwardly from one end of said cylindrical portion and having an inside surface, and a curved portion at the radially innermost portion of said radial flange portion;
 a stationary member comprising an inner anchor portion for snugly fixing on a stationary shaft, at least a main axial seal lip contacting in sealing engagement said inside surface of said radial flange portion for sealing fluid inside the seal unit, and at least an auxiliary dust lip exerting light pressure against said curved portion of said radial flange portion for excluding dirt from entering the seal unit between said dust lip and said curved portion; and
 hydrodynamic grooves on said inside surface of said radial flange portion.

2. A seal unit as claimed in claim 1 wherein:
 a unitizing adapter ring is provided comprising a cylindrical outer portion and a flange portion extending substantially radially inwardly from one end of said adapter ring cylindrical outer portion; and
 an edge portion is provided on said rotary member outer cylindrical portion turned over said adapter ring for locking said adapter ring and said rotary member together as an assembly.

3. A seal unit as claimed in claim 2 wherein:
 a plurality of apertures are provided in said adapter ring radial flange portion to facilitate return of oil therethrough.

4. A seal unit as claimed in claim 1 and further comprising:
 a thin sealant coating on the outer cylindrical surface of said outer cylindrical portion of said rotary member.

5. A seal unit as claimed in claim 1 and further comprising:
 a sealed fluid side surface on said stationary member; and
 a plurality of spacers on said sealed fluid side surface in relative spaced relation with respect to each other.

6. A seal unit as claimed in claim 1 wherein:
 said stationary member further comprises a reinforcing element; and
 said main axial seal lip comprises a flexible material bonded to said reinforceing element and extending axially and radially outwardly relative to said reinforcing element.

7. A seal unit as claimed in claim 6 wherein:
 said flexible material comprises rubber.

8. A seal unit including two members for sealing between a rotary bore and a stationary shaft comprising:
 a rotary member comprising an outer cylindrical portion for mounting by a press fit in a rotary bore, a radial flange portion extending radially inwardly from one end of said cylindrical portion and having an inside surface, and a curved portion at the radially innermost portion of said radial flange portion;
 a stationary member comprising an inner anchor portion for snugly fixing on a stationary shaft, at least a main axial seal lip contacting in sealing engagement said inside surface of said radial flange portion for sealing fluid inside the seal unit, and at least an auxiliary dust lip exerting light pressure against said curved portion of said radial flange portion for excluding dirt from entering the seal unit between said dust lip and said curved portion; and
 inclined grooves on said inside surface of said radial flange portion.

9. A seal unit as claimed in claim 8 wherein:
 said stationary member further comprises a reinforcing element; and
 said main bail seal lip comprises a flexible material bonded to said reinforcing element and extending axially and radially outwardly relative to said reinforcing element.

10. A seal unit as claimed in claim 9 wherein:
said flexible material comprises rubber.

11. A seal unit as claimed in claim 8 wherein:
a unitizing adapter ring is provided comprising a cylindrical outer portion and a flange portion extending substantially radially inwardly from one end of said adapter ring cylindrical outer portion; and an edge portion is provided on said rotary member outer cylindrical portion turned over said adapter ring for locking said adapter ring and said rotary member together as an assembly.

12. A seal unit including tow members for sealing between a rotary bore and a stationary shaft comprising:
a rotary member comprising an outer cylindrical portion for mounting by a press fit in a rotary bore, a radial flange portion extending radially inwardly from one end of said cylindrical portion and having an inside surface, and a rounded portion at the radially innermost portion of said radial flange portion;
a stationary member comprising an inner anchor portion for snugly fixing on a stationary shaft, at lest a main axial seal lip contacting in sealing engagement said inside surface of said radial flange portion for sealing fluid inside the seal unit, and at least an auxiliary dust lip exerting light pressure against said rounded portion of the said radial flange portion for excluding dirt from entering the seal unit between said dust lip and said rounded portion; and
hydrodynamic grooves on said inside surface of said radial flange portion.

13. A seal unit as claimed in claim 12 wherein:
a unitizing adapter ring is provided comprising a cylindrical outer portion and a flange portion extending substantially radially inwardly from one end of said adapter ring cylindrical outer portion; and an edge portion is provided on said rotary member outer cylindrical portion turned over said adapter ring for locking said adapter ring and said rotary member together as an assembly.

14. A seal unit as claimed in claim 13 wherein:
a plurality of apertures are provided in said adapter ring radial flange portion to facilitate return of oil therethrough.

15. A seal unit as claimed in claim 12 wherein:
said stationary member further comprises a reinforcing element; and
said main axial seal lip comprises a flexible material bonded to said reinforcing element and extending axially and radially outwardly relative to said reinforcing element.

16. A seal unit as claimed in claim 15 wherein:
said flexible material comprises rubber.

* * * * *